United States Patent
Xi et al.

(10) Patent No.: US 12,047,128 B2
(45) Date of Patent: Jul. 23, 2024

(54) TRANSMISSION METHOD OF TRP CONTROL INFORMATION, TERMINAL, NETWORK DEVICE, AND COMPUTER-READABLE STORAGE MEDIUM

(71) Applicant: VIVO MOBILE COMMUNICATION CO., LTD., Dongguan (CN)

(72) Inventors: Wei Xi, Dongguan (CN); Peng Sun, Dongguan (CN); Na Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 426 days.

(21) Appl. No.: 17/355,153

(22) Filed: Jun. 22, 2021

(65) Prior Publication Data

US 2021/0320691 A1 Oct. 14, 2021

Related U.S. Application Data

(63) Continuation of application No. PCT/CN2019/111365, filed on Oct. 16, 2019.

(30) Foreign Application Priority Data

Dec. 27, 2018 (CN) .......................... 201811615857.9

(51) Int. Cl.
*H04B 7/024* (2017.01)
*H04W 72/21* (2023.01)
*H04W 72/23* (2023.01)

(52) U.S. Cl.
CPC ............ *H04B 7/024* (2013.01); *H04W 72/21* (2023.01); *H04W 72/23* (2023.01)

(58) Field of Classification Search
None
See application file for complete search history.

(56) References Cited

U.S. PATENT DOCUMENTS

| 2017/0332283 | A1 | 11/2017 | Kubota et al. |
| 2020/0015250 | A1* | 1/2020 | Yang ....................... H04L 5/001 |
| 2021/0153262 | A1* | 5/2021 | Mochizuki ........ H04W 74/0833 |

FOREIGN PATENT DOCUMENTS

| CN | 105827386 A | 8/2016 |
| CN | 107836086 A | 3/2018 |

(Continued)

OTHER PUBLICATIONS

International Search Report issued in corresponding International Application No. PCT/CN2019/111365, mailed Jan. 2, 2020, 5 pages.

(Continued)

*Primary Examiner* — Jamaal Henson
(74) *Attorney, Agent, or Firm* — IPX PLLC

(57) ABSTRACT

Embodiments of the present disclosure provide a transmission method, a terminal, a network device, and a computer-readable storage medium. The transmission method may be performed by a terminal or a network device. The transmission method performed by the terminal includes sending at least one piece of control information by using a target uplink channel, where each piece of control information corresponds to Transmission Reception Point (TRP) identifier information, the TRP identifier information is used to determine a target TRP corresponding to the control information, and the target TRP is one TRP in multi-TRP transmission.

15 Claims, 4 Drawing Sheets

(56) References Cited

FOREIGN PATENT DOCUMENTS

| CN | 107872833 A | 4/2018 |
| CN | 109076412 A | 12/2018 |
| WO | 2018085374 A1 | 5/2018 |
| WO | 2018174811 A1 | 9/2018 |

OTHER PUBLICATIONS

Huawei, "Discussion on UL multi-panel/TRP operation", 3GPP Draft; R1-1714345, Aug. 25, 2017.
First Office Action issued in related Chinese Application No. 201811521027.X, mailed Nov. 29, 2019.
Mitsubishi Electric, "Views on multi-beam operation", 3GPP TSG RAN WG1 Meeting #95, R1-1813384, Nov. 16, 2018.
LG Electronics, "Updated feature lead summary of Enhancements on Multi-beam Operations", 3GPP TSG RAN WG1 Meeting #95, R1-1814122, Nov. 16, 2018.

* cited by examiner

TRANSMISSION METHOD OF TRP CONTROL INFORMATION, TERMINAL, NETWORK DEVICE, AND COMPUTER-READABLE STORAGE MEDIUM

CROSS-REFERENCE TO RELATED APPLICATIONS

This application is a continuation of PCT Application No. PCT/CN2019/111365, filed Oct. 16, 2019, which claims priority to Chinese Patent Application No. 201811615857.9, filed on Dec. 27, 2018 in China, both of which are incorporated herein by reference in their entireties.

TECHNICAL FIELD

The present disclosure relates to the field of communications technologies, and in particular, to a transmission method, a terminal, a network device, and a computer-readable storage medium.

BACKGROUND

To improve transmission reliability and validity, a multi-TRP/panel transmission technology is proposed in a Multiple Input Multiple Output (MIMO) technology, that is, a plurality of Transmission Reception Point (TRP) may send a same data stream or different data streams to same User Equipment (UE).

In a multi-TRP transmission scenario, the UE needs to send control information by using a Physical Uplink Control Channel (PUCCH) or a Physical Uplink Shared Channel (PUSCH). The control information includes Hybrid Automatic Repeat Request (HARQ) information, Channel State Information (CSI) information, and the like.

However, in the multi-TPR transmission scenario, there is no solution to distinguish control information of different TPRs in the related art.

SUMMARY

Embodiments of the present disclosure provide a transmission method, a terminal, a network device, and a computer-readable storage medium.

According to a first aspect, an embodiment of the present disclosure provides a transmission method, applied to a terminal. The transmission method includes:
  sending at least one piece of control information by using a target uplink channel, where
  each piece of control information corresponds to transmission reception point TRP identifier information, the TRP identifier information is used to determine a target TRP corresponding to the control information, and the target TRP is one TRP in multi-TRP transmission.

According to a second aspect, an embodiment of the present disclosure provides a transmission method, applied to a network device. The transmission method includes:
  receiving, by using a target uplink channel, control information sent by a terminal, where
  the control information corresponds to TRP identifier information, the TRP identifier information is used to determine a target transmission reception point TRP corresponding to the control information, and the target TRP is one TRP in multi-TRP transmission.

According to a third aspect, an embodiment of the present disclosure provides a terminal, and the terminal includes:
  a sending module, configured to send at least one piece of control information by using a target uplink channel, where
  each piece of control information corresponds to transmission reception point TRP identifier information, the TRP identifier information is used to determine a target TRP corresponding to the control information, and the target TRP is one TRP in multi-TRP transmission.

According to a fourth aspect, an embodiment of this disclosure provides a network device, and the network device includes:
  a receiving module, configured to receive, by using a target uplink channel, control information sent by a terminal, where
  the control information corresponds to TRP identifier information, the TRP identifier information is used to determine a target transmission reception point TRP corresponding to the control information, and the target TRP is one TRP in multi-TRP transmission.

According to a fifth aspect, an embodiment of the present disclosure provides a terminal, including: a memory, a processor, and a computer program that is stored in the memory and that can run on the processor, and when the processor executes the computer program, the steps of the transmission method applied to the terminal are implemented.

According to a sixth aspect, an embodiment of the present disclosure provides a network device, including: a memory, a processor, and a computer program that is stored in the memory and that can run on the processor, and when the processor executes the computer program, the steps of the transmission method applied to the network device are implemented.

According to a seventh aspect, an embodiment of the present disclosure provides a computer-readable storage medium, where the computer-readable storage medium stores a computer program, and when a processor executes the computer program, the steps of the transmission method applied to the terminal are implemented, or when a processor executes the computer program, the steps of the transmission method applied to the network device are implemented.

In embodiments of the present disclosure, at least one piece of control information is sent by using a target uplink channel, where each piece of control information corresponds to transmission reception point TRP identifier information, the TRP identifier information is used to determine a target TRP corresponding to the control information, and the target TRP is one TRP in multi-TRP transmission. In this way, a network side device can determine the target TRP based on the TRP identifier information corresponding to the control information, to distinguish control information of each TRP in multi-TRP transmission.

BRIEF DESCRIPTION OF DRAWINGS

To describe the technical solutions in the embodiments of the present invention more clearly, the following briefly describes the accompanying drawings required for describing the embodiments or the related art. Apparently, the accompanying drawings in the following description show merely some embodiments of the present invention, and a person of ordinary skill in the art may still derive other drawings from these accompanying drawings.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

In a multi-TRP transmission scenario, UE may feed back control information such as a HARQ, CSI, and a scheduling request to a network device by using a PUCCH or a PUSCH. A manner of feeding back the control information may be a joint feedback, or may be an independent feedback.

In the joint feedback manner, the UE sends control information of a plurality of TRPs by using one PUCCH/PUSCH. In the independent feedback manner, the UE feeds back control information of each TRP by using one PUCCH/PUSCH. Therefore, control information of different TRPs is transmitted by using different PUCCHs/PUSCHs.

In a transmission method provided in the embodiments of the present disclosure, one piece of TRP identifier information is set for each TRP, to distinguish between each TRP and control information corresponding to each TRP by using the TRP identifier information, thereby resolving a problem of distinguishing control information of each TRP in a multi-TRP transmission technology.

Figure 1:
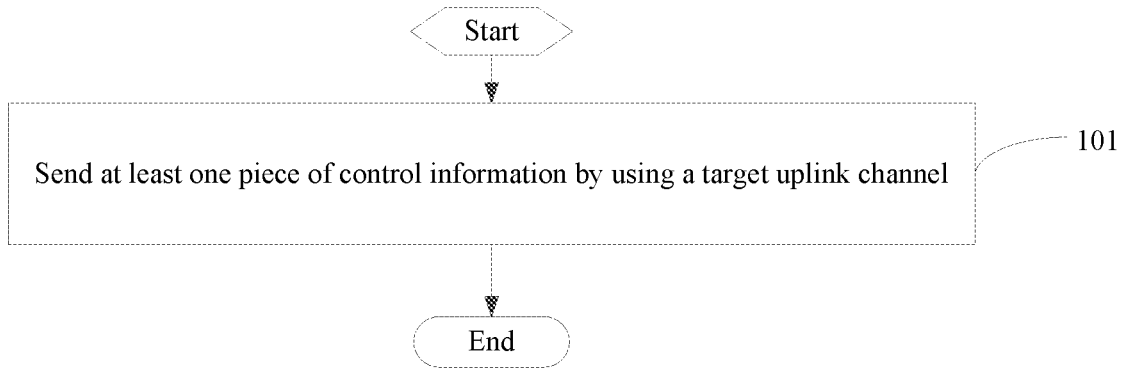
FIG. 1 is a flowchart of a transmission method applied to a terminal according to an embodiment of the present disclosure.

Referring to FIG. 1, FIG. 1 is a flowchart of a transmission method applied to a terminal according to an embodiment of the present disclosure. As shown in FIG. 1, the transmission method is applied to the terminal and includes the following steps.

Step 101: Send at least one piece of control information by using a target uplink channel.

Each piece of control information corresponds to transmission reception point TRP identifier information, the TRP identifier information is used to determine a target TRP corresponding to the control information, and the target TRP is one TRP in multi-TRP transmission.

The control information may be any one or more of HARQ information, CSI information, an SR, and other control information.

As mentioned above, a manner of feeding back control information may be a joint feedback and an independent feedback. In a case of the joint feedback, the control information corresponds to a plurality of TRPs, that is, the target uplink channel includes a plurality of pieces of control information, and each piece of control information corresponds to one TRP. In a case of the independent feedback, the target uplink channel includes one piece of control information, and the piece of control information corresponds to one TPR.

In a specific embodiment of the present disclosure, when receiving the control information, a network side device can determine, based on the TRP identifier information corresponding to the control information, the target TRP corresponding to the control information, so that control information of each TRP can be prevented from being obfuscated in multi-TRP transmission.

It should be noted that when the uplink channel is a PUCCH, all the control information is transmitted as Uplink Control Information (UCI) of the PUCCH. When the uplink channel is a PUSCH, the control information is transmitted as a payload of the PUSCH.

In an optional implementation, the TRP identifier information is determined based on at least one of the following information:

an identifier of a Control Resource Set (CORESET) corresponding to the target TRP;

a predefined TRP identifier;

a field value of at least one field in Downlink Control Information (DCI) corresponding to the target TRP;

an identifier of a search space corresponding to the target TRP;

a scrambling identifier of a CORESET corresponding to the target TRP; and a cell radio network temporary identifier of a cell to which the target TRP belongs.

The foregoing information is separately described in detail below.

Case 1

The TRP identifier information is determined based on the identifier of the CORESET corresponding to the target TRP.

In this manner, the identifier of the CORESET corresponding to the target TRP may be directly used as the TRP identifier information. Certainly, specified processing (for example, weighting, combining with a preset character, and combining with the identifier of the CORESET) may be further performed on the identifier of the CORESET corresponding to the target TRP to obtain the TRP identifier information. This is not specifically limited herein.

For example, a TRP A and a TRP B participate in multi-TRP transmission for specified UE. The TRP A uses two CORESETs: a CORESET-A and a CORESET-B; and the TRP B uses three CORESETs: a CORESET-B, a CORESET-C, and a CORESET-D. Identifiers of the CORESETs meet a relationship: CORESET-A<CORESET-B<CORESET-C<CORESET-D.

After receiving a PDSCH sent by the TRP A and a PDSCH sent by the TRP B, the UE sends control information to the TRP A and the TRP B by using a PUCCH.

Identifier information of the TRP A may be set to an identifier of a CORESET that is used only by the TRP A but not by the TRP B, for example, the CORESET-A. Similarly, identifier information of the TRP B may be set to an identifier of a CORESET that is used only by the TRP B but not by the TRP A.

When a CORESET that meets the foregoing condition is not unique, a CORESET identifier may be selected from the CORESET that meets the foregoing condition as the TRP identifier information. For example, a CORESET identifier that has a smallest value (for example, the CORESET-C) or a largest value (for example, the CORESET-D) in the CORESET identifiers is selected as the TRP (for example, TRP B) identifier information.

It should be noted that in this implementation, the UE may send control information of the TRP A and control information of the TRP B in a joint feedback manner, or may separately send control information of the TRP A and control information of the TRP B in a separate feedback manner.

In this implementation, the CORESET identifier of the CORESET that is uniquely used by the target TRP is used as the TRP identifier information, and after receiving the control information, the network device determines the TRP identifier information corresponding to the control information, and further determines, based on the TRP identifier information, the TRP corresponding to the control information, to distinguish control information of each TRP in multi-TRP transmission.

Certainly, in a specific embodiment of the present disclosure, a combination of CORESET identifiers (that is, the CORESET-A and the CORESET-B) of CORESETs used by the TRP A may further be used as TRP identifier information of the control information sent to the TRP A, and a combination of CORESET identifiers (that is, the CORESET-B, the CORESET-C, and the CORESET-D) used by the TRP B is used as TRP identifier information of the control information sent to the TRP B.

In this manner, as long as a combination of CORESETs used by the TRP A is different from a combination of CORESETs used by the TRP B, TRP identifier information is also different.

In conclusion, when the identifier of the CORESET is used to determine the TRP identifier information, each TRP in multi-TRP transmission can obtain a respective unique TRP identifier, for example When there is no intersection set of CORESETs configured for each TRP, a CORESET identifier of any one CORESET in CORESET sets corresponding to the TRPs is selected as TRP identifier information. However, a minimum or maximum CORESET identifier may also be purposefully selected as TRP identifier information.

In a case in which there is an intersection set of CORESETs configured for all TRPs, an identifier of the CORESET used by the TRP but not by another TRP is selected to identify the TRP. If the CORESET that meets the condition is not unique, a minimum or maximum CORESET identifier may be selected from the CORESET set that meets the condition as TRP identifier information.

In the foregoing manner, the network side device identifies the identifier of the CORESET corresponding to the received control information, so that the target TRP corresponding to the identifier of the CORESET can be determined. Therefore, different CORESETs used by different TRPs are used to distinguish between each TRP and control information of each TRP.

Case 2

The TRP identifier information is determined based on the predefined TRP identifier.

In this implementation, unique TRP identifier information of each TRP is predefined in a predefined manner.

Case 3

The TRP identifier information is determined based on a field value of one or more fields in the DCI corresponding to the target TRP.

The field in the DCI may be: a Transmission Configuration Indication (TCI) field, a PUCCH Resource Indicator (PRI) field, and/or the like in the DCI corresponding to the target TRP are/is used as the TRP identifier information of the target TRP.

It should be understood that any unique field value or a combination of unique field values in the DCI corresponding to the TRP may be used as the TRP identifier information.

Case 4

The TRP identifier information is determined based on the identifier of the search space corresponding to the target TRP.

A network configures a plurality of search space identifiers for a cell by using Radio Resource Control (RRC) signaling, and then associates a search space identifier of a cell with a TRP of the cell.

Therefore, each TRP in multi-TRP transmission corresponds to a different search space identifier, so that the search space identifier can be used to identify the TRP (that is, used as TRP identifier information of the TRP).

A manner of associating the search space identifier with the TRP may be an explicit or an implicit manner. In the explicit manner, the network device notifies the UE of the association relationship (for example, the search space identifier associated with each TRP) by using signaling; and in the implicit manner, the network device allocates the search space identifier configured for the cell into the TRP of the cell in a static manner (for example, equal allocation).

TRP identifier information of all TRPs in a multi-TRP transmission technology may be determined as different search space identifiers in a predefined manner, that is, all TRPs are associated with different search space identifiers.

In this way, all TRPs in the multi-TRP transmission technology and control information thereof may be distinguished by using different search space identifiers.

Case 5

The TRP identifier information is determined based on the scrambling identifier of the CORESET corresponding to the target TRP.

The scrambling identifier may be a scrambling identifier used by a Demodulation Reference Signal (DMRS); or a scrambling identifier used in DCI; or a scrambling identifier used by a Cyclic Redundancy Check (CRC).

The scrambling identifier of the CORESET corresponding to the target TRP may be directly used as the TRP identifier information of the target TRP.

Case 6

The TRP identifier information is determined based on the cell radio network temporary identifier of the cell to which the target TRP belongs.

A cell radio network temporary identifier of a cell to which each TRP belongs is different from each other, so that the radio network temporary identifier of the cell can be used as TRP identifier information of a TRP corresponding to the cell.

It should be understood that, that each piece of control information corresponds to transmission reception point TRP identifier information represents that each piece of control information has one piece of corresponding TRP identifier information, and the TRP identifier information may be transmitted in an explicit or implicit manner. Details are separately described below.

In an optional implementation, the TRP identifier information is carried on the target uplink channel, that is, the TRP identifier information is transmitted together with the control information in an explicit manner.

In this manner, the TRP identifier information may be transmitted together with the control information to the network device by using a PUCCH or a PUSCH.

In this manner, when the uplink channel is a PUCCH, one or more pieces of control information and the TRP identifier information are transmitted together as UCI of the PUCCH. When the uplink channel is a PUSCH, the control information and the TRP identifier information are carried in a payload of the PUSCH together.

In this implementation, the network device may receive both the control information and the TRP identifier information corresponding to the control information, to determine, based on the TRP identifier information, the TRP corresponding to the control information, so as to distinguish each TRP and control information thereof.

In an optional implementation, the TRP identifier information may also be transmitted in an implicit manner, that is, the TRP identifier information is not transmitted together with the control information.

An example in which the TRP identifier information is determined based on a field value of a PRI field in DCI corresponding to the target TRP is used for description below.

Figure 2:
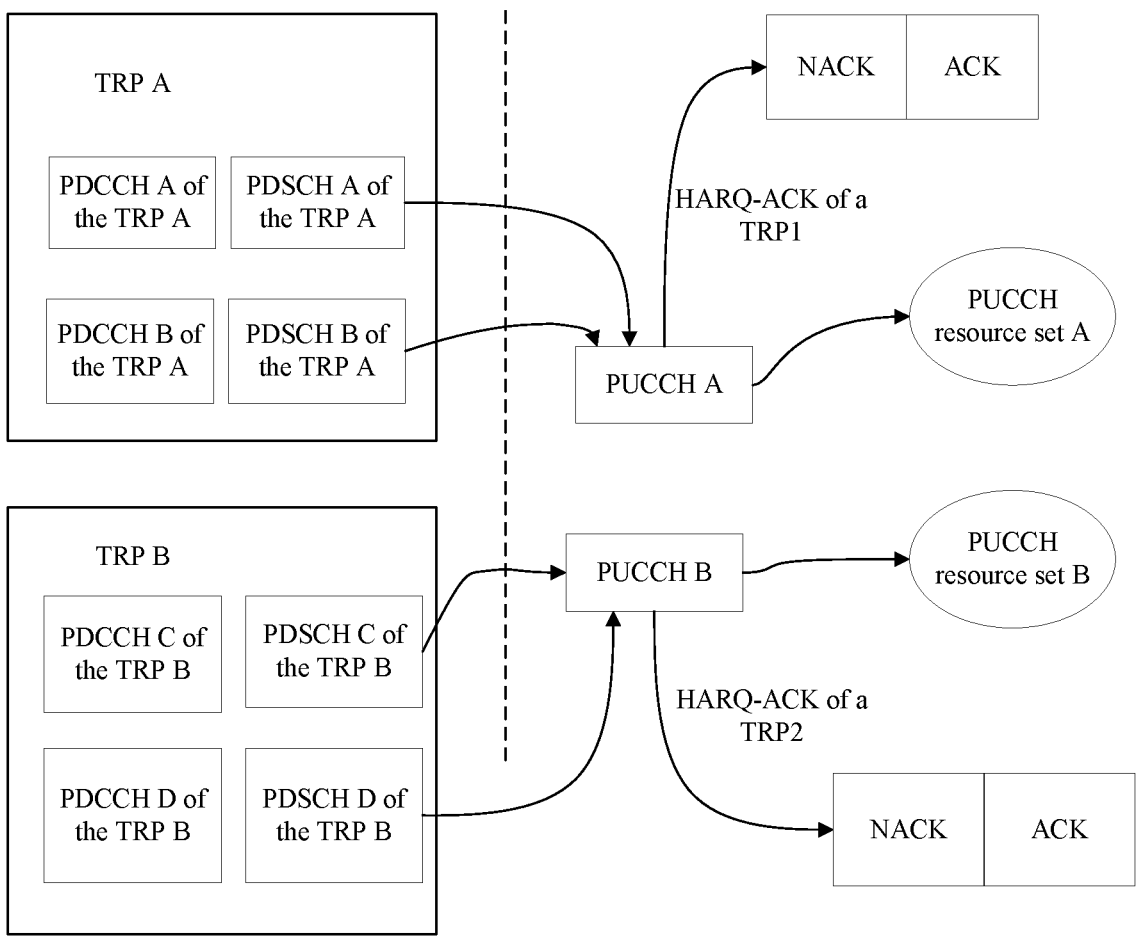
FIG. 2 is an application scenario diagram of a transmission method applied to a terminal according to an embodiment of the present disclosure.

In an application scenario shown in FIG. 2, the TRP A and the TRP B perform multi-TRP data transmission on specified UE. The UE independently feeds back HARQ information of two TRPs by using two PUCCHs (a PUCCH A and a PUCCH B shown in FIG. 2).

Implicit transmission is used as an example for description below.

The TRP A is used as an example, and the UE first determines a candidate PUCCH resource set based on a payload size of control information corresponding to the TRP A. Then, the UE further determines, by using a PRI in the last PDCCH (a PDCCH B in this embodiment) sent by the received TRP A, a resource of a PUCCH (a PUCCH A in this embodiment) used to feed back HARQ information of the TRP A, and finally HARQ information for carrying the TRP A is sent by using the determined resource (the PUCCH A in this embodiment).

When receiving the PUCCH A, the network side device may determine, based on a resource characteristic of the PUCCH A, that the HARQ information carried in the PUCCH A corresponds to the UE.

In other words, in the foregoing embodiment, there is a specified mapping relationship between TRP identifier information and a resource characteristic. The terminal determines a resource based on the TRP identifier information, and the network side determines terminal identifier information based on the resource. The TRP identifier information is not actually transmitted, thereby implementing implicit transmission of the TRP identifier information.

In the foregoing description, the TRP identifier information is determined based on the field value of the PRI field. However, it should be understood that the TRP identifier information may be determined based on a field value of another field or a combination of field values of a plurality of fields, provided that uniqueness of the TRP identifier information is ensured. This is not described in detail herein.

In this embodiment of the present disclosure, at least one piece of control information is sent by using a target uplink channel, where each piece of control information corresponds to transmission reception point TRP identifier information, the TRP identifier information is used to determine a target TRP corresponding to the control information, and the target TRP is one TRP in multi-TRP transmission. In this way, a network side device can determine, based on the target uplink channel, a corresponding terminal that corresponding control information is from, to distinguish control information of each TRP in multi-TRP transmission.

Figure 3:
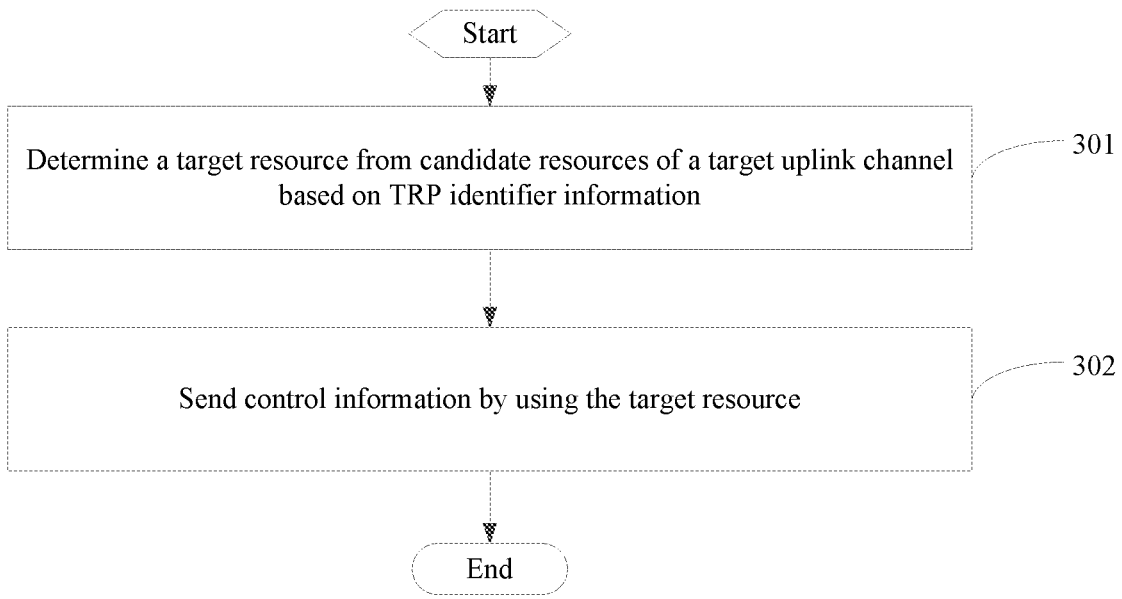
FIG. 3 is a flowchart of another transmission method applied to a terminal according to an embodiment of the present disclosure.

Referring to FIG. 3, FIG. 3 is a flowchart of another transmission method according to an embodiment of the present disclosure. The transmission method is applied to a terminal, and TRP identifier information is implicitly transmitted. As shown in FIG. 3, the transmission method applied to the terminal includes the following steps.

Step 301: Determine a target resource from candidate resources of a target uplink channel based on TRP identifier information.

The candidate resources may be a resource set configured by a network for an uplink channel, and TRP identifier information of each TRP corresponds to a different target resource.

In an optional implementation, step 301 includes:
determining a resource characteristic based on the TRP identifier information; and
determining, from the candidate resources of the target uplink channel, a resource having the resource characteristic as the target resource.

The resource characteristic may include at least one of the following characteristics: a beam in which a resource is located, a sending time of the resource, a time domain characteristic of the resource, and a frequency domain characteristic of the resource.

In this implementation, each TRP corresponds to a different resource characteristic. For example, the resource characteristic is the beam in which the resource is located, and a target transmission resource of each TRP is located in a different beam.

In this way, when receiving control information transmitted by the target transmission resource, the network device determines, based on a characteristic of the target resource, a terminal that the control information corresponding to the target resource is from, to distinguish control information of each TRP in multi-TRP transmission.

Step 302: Send control information by using the target resource.

In this embodiment of the present disclosure, based on a pre-established mapping relationship between TRP identifier information and a resource characteristic, a terminal can select a transmission resource corresponding to the TRP identifier information when transmitting control information, and a network side can determine, based on the transmission resource of the control information, a terminal that the control information is from, to distinguish control information of each TRP in multi-TRP transmission.

In this process, the TRP identifier information is not actually transmitted, so that the TRP identifier information is implicitly transmitted, and overheads are saved.

Figure 4:
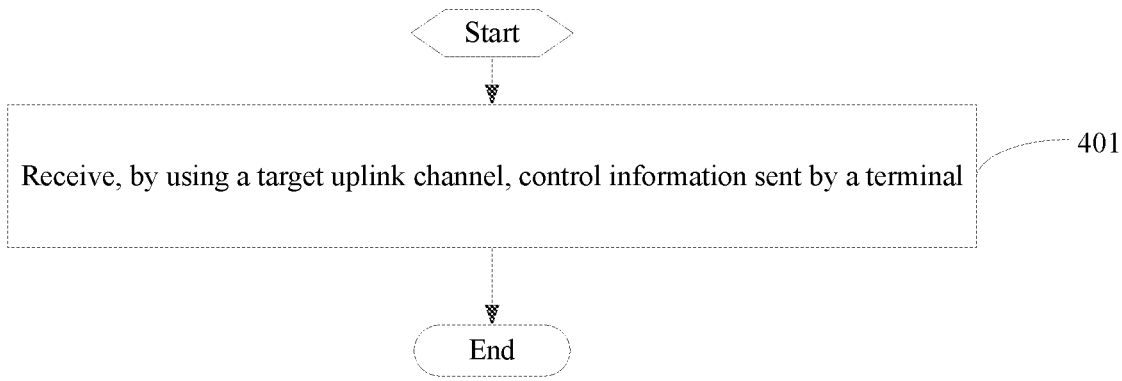
FIG. 4 is a flowchart of a transmission method applied to a network device according to an embodiment of the present disclosure.

Referring to FIG. 4, FIG. 4 is a flowchart of a transmission method according to an embodiment of the present disclosure. The transmission method is applied to a network device, and the transmission method applied to the network device includes the following steps.

Step 401: Receive, by using a target uplink channel, control information sent by a terminal.

The control information corresponds to TRP identifier information, the TRP identifier information is used to determine a target transmission reception point TRP corresponding to the control information, and the target TRP is one TRP in multi-TRP transmission.

The control information is the same as the control information sent by the terminal by using the target uplink channel in the method embodiment shown in FIG. 1.

In addition, the TRP identifier information is the same as the TRP identifier information in the method embodiment shown in FIG. 1, and functions the same. Details are not described herein again.

Optionally, the TRP identifier information is carried on the target uplink channel.

In this embodiment and the method embodiment shown in FIG. 3, functions of the TRP identifier information carried on the target uplink channel are the same. Details are not described herein again.

Optionally, a transmission resource of the target uplink channel is determined based on the TRP identifier information.

In an optional embodiment, before the receiving, by using a target uplink channel, control information sent by a terminal, the method further includes:

determining terminal identifier information of the terminal; and determining the target resource based on the terminal identifier information and the TRP identifier information; and the receiving, by using a target uplink channel, control information sent by a terminal is specifically:

receiving, by using the target resource, the control information sent by the terminal.

Optionally, the determining a target resource based on the terminal identifier information and the TRP identifier information is specifically:

determining a resource characteristic based on the terminal identifier information and the TRP identifier information; and determining a resource having the resource characteristic as the target resource.

The resource characteristic is the same as the resource characteristic in the method embodiment shown in FIG. 3, and functions the same. Details are not described herein again.

Optionally, the TRP identifier information is determined based on at least one of the following information:

an identifier of a CORESET corresponding to the target TRP;

an identifier of a search space corresponding to the target TRP;

a predefined TRP identifier;

a scrambling identifier of a CORESET corresponding to the target TRP;

a cell radio network temporary identifier of a cell to which the target TRP belongs; and a field value of at least one field in DCI corresponding to the target TRP.

The manner of determining the TRP identifier information is the same as the manner of determining the TRP identifier information in the method embodiment shown in FIG. 3, and functions the same. Details are not described herein again.

In this embodiment of the present disclosure, the network device can receive, by using a target uplink channel, control information sent by a terminal, and determine, based on TRP identifier information corresponding to the control information, a TRP corresponding to the control information, to avoid a problem of obfuscation of control information of each TRP in a multi-TRP transmission technology, thereby improving reliability of a transmission method.

Figure 5:
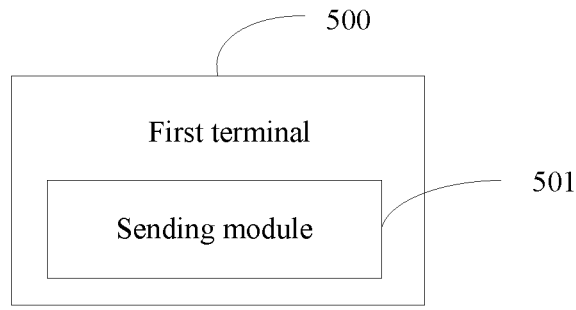
FIG. 5 is a structural diagram 1 of a first terminal according to an embodiment of the present disclosure.

Referring to FIG. 5, FIG. 5 is a structural diagram of a first terminal according to an embodiment of the present disclosure. As shown in FIG. 5, a terminal 500 includes:

a sending module 501, configured to send at least one piece of control information by using a target uplink channel, where each piece of control information corresponds to transmission reception point TRP identifier information, the TRP identifier information is used to determine a target TRP corresponding to the control information, and the target TRP is one TRP in multi-TRP transmission.

Optionally, the TRP identifier information is carried on the target uplink channel.

Optionally, a transmission resource of the target uplink channel is determined based on the TRP identifier information.

Figure 6:
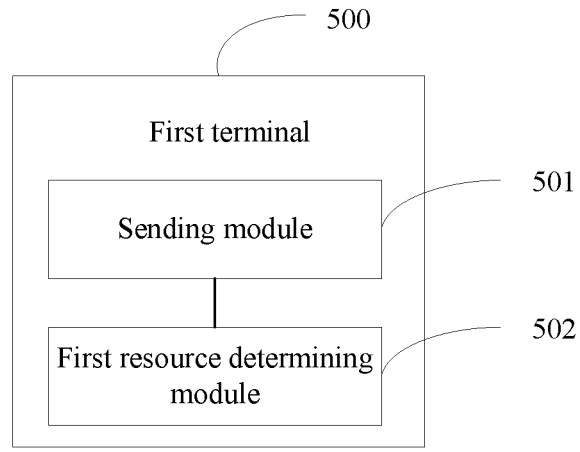
FIG. 6 is a structural diagram 2 of a first terminal according to an embodiment of the present disclosure.

Optionally, as shown in FIG. 6, the terminal 500 further includes:

a first resource determining module 502, configured to: before the control information is sent by using the target uplink channel, determine a target resource from candidate resources of the target uplink channel based on the TRP identifier information; and the sending module 501 is specifically configured to send the control information by using the target resource.

Optionally, the first resource determining module 502 is specifically configured to:

determine a resource characteristic based on the TRP identifier information; and determine, from the candidate resources of the target uplink channel, a resource having the resource characteristic as the target resource.

Optionally, the resource characteristic includes at least one of the following characteristics: a beam in which a resource is located, a sending time of the resource, a time domain characteristic of the resource, and a frequency domain characteristic of the resource.

Optionally, the TRP identifier information is determined based on at least one of the following information:

an identifier of a CORESET corresponding to the target TRP;

an identifier of a search space corresponding to the target TRP;

a predefined TRP identifier;

a scrambling identifier of a CORESET corresponding to the target TRP;

a cell radio network temporary identifier of a cell to which the target TRP belongs; and a field value of at least one field in DCI corresponding to the target TRP.

In this embodiment of the present disclosure, the steps of the transmission method applied to the terminal in the method embodiment shown in FIG. 1 or FIG. 3 can be implemented, and a same beneficial effect is achieved. To avoid repetition, details are not described herein again.

Figure 7:
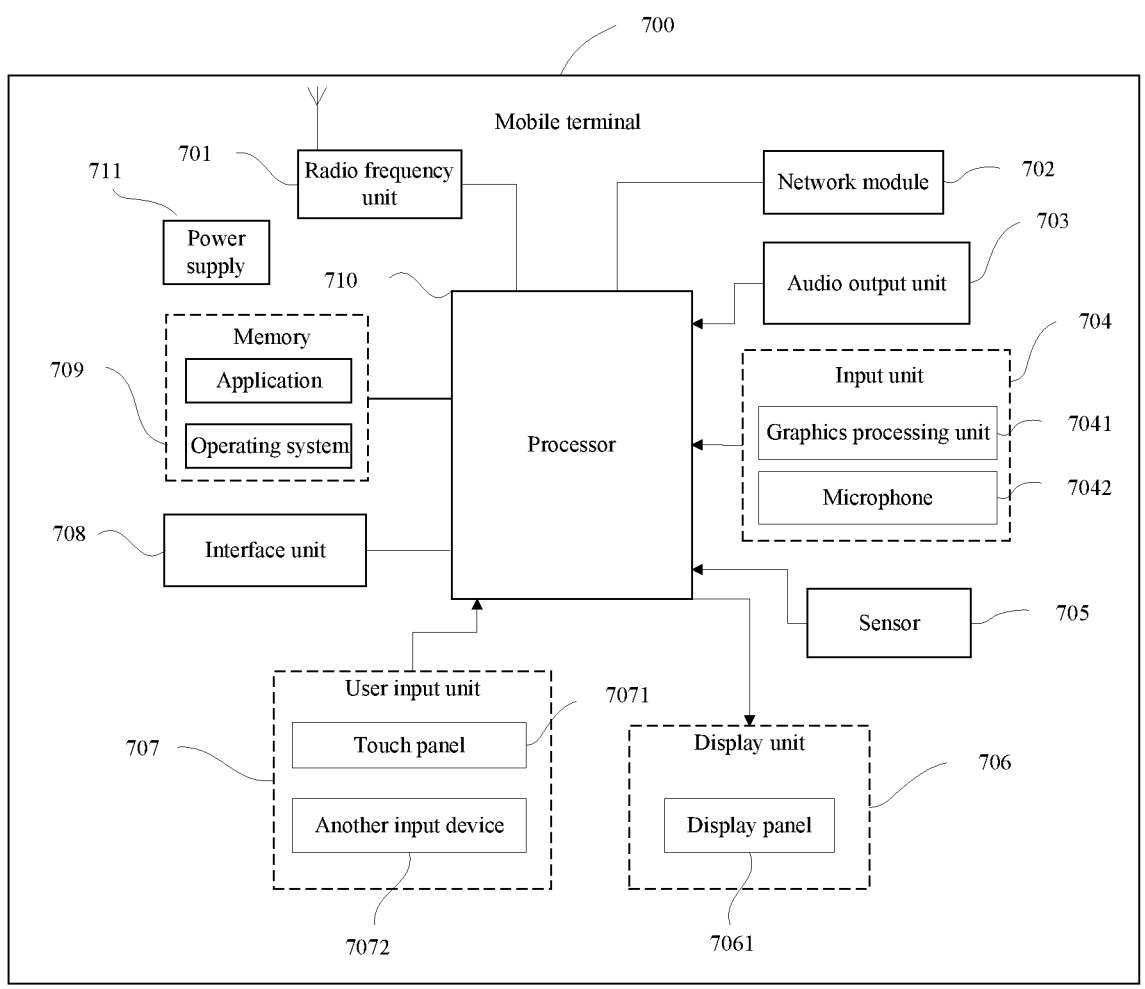
FIG. 7 is a structural diagram of a mobile terminal according to an embodiment of the present disclosure.

Referring to FIG. 7, FIG. 7 is a structural diagram of a mobile terminal according to an embodiment of the present disclosure. FIG. 7 is a schematic structural diagram of hardware of a mobile terminal 700 that implements the method embodiment shown in FIG. 1 or FIG. 3. As shown in FIG. 7, the mobile terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. It may be understood by a person skilled in the art that, the terminal structure shown in FIG. 7 does not constitute any limitation on the terminal, and the terminal may include more or fewer components than those shown in the figure, or combine some components, or have different component arrangements. In this embodiment of the present disclosure, the mobile terminal includes but is not limited to a mobile phone, a tablet computer, a notebook computer, a palmtop computer, an in-vehicle terminal, a wearable device, a pedometer, and the like.

The radio frequency unit 701 is configured to send at least one piece of control information by using a target uplink channel, where each piece of control information corresponds to transmission reception point TRP identifier information, the TRP identifier information is used to determine a target TRP corresponding to the control information, and the target TRP is one TRP in multi-TRP transmission.

Optionally, the TRP identifier information is carried on the target uplink channel.

Optionally, a transmission resource of the target uplink channel is determined based on the TRP identifier information.

Optionally, before the radio frequency unit 701 sends the control information by using the target uplink channel, the processor 710 is configured to:

determine a target resource from candidate resources of the target uplink channel based on the TRP identifier information; and the radio frequency unit 701 is specifically configured to: send the control information by using the target resource.

Optionally, that the step, performed by the processor 710, of determining a target resource from candidate resources of the target uplink channel based on the TRP identifier information is specifically:

determining a resource characteristic based on the TRP identifier information; and determining, from the candidate resources of the target uplink channel, a resource having the resource characteristic as the target resource.

Optionally, the resource characteristic includes at least one of the following characteristics: a beam in which a resource is located, a sending time of the resource, a time domain characteristic of the resource, and a frequency domain characteristic of the resource.

Optionally, the TRP identifier information is determined based on at least one of the following information:

an identifier of a CORESET corresponding to the target TRP;

an identifier of a search space corresponding to the target TRP;

a predefined TRP identifier;

a scrambling identifier of a CORESET corresponding to the target TRP;

a cell radio network temporary identifier of a cell to which the target TRP belongs; and a field value of at least one field in DCI corresponding to the target TRP.

The mobile terminal 700 can implement each process implemented by the terminal in the embodiment shown in FIG. 1 or FIG. 3. To avoid repetition, details are not described herein again.

According to the mobile terminal 700 in this embodiment of the present disclosure, at least one piece of control information is sent by using a target uplink channel, where each piece of control information corresponds to transmission reception point TRP identifier information, the TRP identifier information is used to determine a target TRP corresponding to the control information, and the target TRP is one TRP in multi-TRP transmission. Therefore, all TRPs correspond to different TRP identifier information, so that after receiving control information, a network device can distinguish, based on TRP identifier information, a TRP to which the control information belongs. In this way, control information of each TRP is not obfuscated in multi-TRP transmission, thereby improving information transmission reliability.

It should be understood that, in this embodiment of the present disclosure, the radio frequency unit 701 may be further configured to receive and send information or a signal in a call process. Specifically, after receiving downlink data from a base station, the radio frequency unit 701 sends the downlink data to the processor 710 for processing. In addition, the radio frequency unit 701 sends uplink data to the base station. Usually, the radio frequency unit 701 includes but is not limited to an antenna, at least one amplifier, a transceiver, a coupler, a low noise amplifier, a duplexer, and the like. In addition, the radio frequency unit 701 may communicate with a network and another device by using a wireless communications system.

The user equipment provides wireless broadband Internet access for a user by using a network module 702, for example, helping the user send and receive an email, brows a web page, and access streaming media.

The audio output unit 703 may convert audio data received by the radio frequency unit 701 or the network module 702 or stored in the memory 709 into an audio signal and output the audio signal as a sound. In addition, the audio output unit 703 may further provide an audio output (for example, a call signal received voice, or a message received voice) related to a specific function implemented by the mobile terminal 700. The audio output unit 703 includes a speaker, a buzzer, a telephone receiver, and the like.

The input unit 704 is configured to receive an audio signal or a video signal. The input unit 704 may include a Graphics Processing Unit (GPU) 7041 and a microphone 7042. The graphics processing unit 7041 processes image data of a static picture or a video obtained by an image capture apparatus (for example, a camera) in video capture mode or image capture mode. A processed image frame may be displayed on the display unit 706. The image frame processed by the graphics processing unit 7041 can be stored in the memory 709 (or another storage medium) or sent via the radio frequency unit 701 or the network module 702. The microphone 7042 may receive sound and can process such sound into audio data. The processed audio data may be converted, in a call mode, into a format that can be sent to a mobile communication base station by using the radio frequency unit 701 for output.

The mobile terminal 700 may further include at least one sensor 705 such as an optical sensor, a motion sensor, or another sensor. Specifically, the optical sensor includes an ambient light sensor and a proximity sensor. The ambient light sensor may adjust luminance of the display panel 7061 based on brightness of ambient light, and the proximity sensor may disable the display panel 7061 and/or backlight when the mobile terminal 700 approaches an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information entered by a user or information provided for a user. The display unit 706 may include a display panel 7061. The display panel 7061 may be configured in a form of a Liquid Crystal Display (LCD), an Organic Light-Emitting Diode (OLED), or the like.

The user input unit 707 may be configured to: receive digit or character information that is input, and generate key signal input related to user setting and function control of the mobile terminal. Specifically, the user input unit 707 includes a touch panel 7071 and another input device 7072. The touch panel 7071 is also referred to as a touchscreen, and may collect a touch operation performed by a user on or near the touch panel 7071 (such as an operation performed by a user on the touch panel 7071 or near the touch panel 7071 by using any proper object or accessory, such as a finger or a stylus). The touch panel 7071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 710, and can receive and execute a command sent by the processor 710. In addition, the touch panel 7071 can be implemented in various types such as resistive, capacitive, infrared, and surface acoustic waves. The user input unit 707 may include another input device 7072 in addition to the touch panel 7071. Specifically, the another input device 7072 may include but is not limited to a physical keyboard, a functional button (such as a volume control button or a power on/off button), a trackball, a mouse, and a joystick. Details are not described herein.

Further, the touch panel 7071 may cover the display panel 7061. After detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, although the touch panel 7071 and the display panel 7061 are used as two independent parts to implement input and output functions of the mobile terminal, in some embodiments, the touch panel 7071 and the display panel 7061 may be integrated to implement the input and output functions of the mobile terminal. This is not specifically limited herein.

The interface unit 708 is an interface for connecting an external apparatus with the mobile terminal 700. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 708 may be configured to receive input (for example, data information and power) from an external apparatus and transmit the received input to one or more elements in the mobile terminal 700 or may be configured to transmit data between the mobile terminal 700 and an external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 709 may include a high-speed random access memory, and may further include a nonvolatile memory, for example, at least one magnetic disk storage device, a flash storage device, or another volatile solid-state storage device.

The processor 710 is a control center of the mobile terminal and is connected to all the parts of the entire mobile terminal by using various interfaces and lines, and performs various functions of the mobile terminal and data processing by running or executing the software program and/or module that are/is stored in the memory 709 and by invoking data stored in the memory 709, so as to perform overall monitoring on the mobile terminal. The processor 710 may include one or more processing units. Optionally, an application processor and a modem processor may be integrated into the processor 710. The application processor mainly processes an operating system, a user interface, an application program, and the like. The modem processor mainly processes wireless communications. It can be understood that alternatively, the modem processor may not be integrated into the processor 710.

The mobile terminal 700 may further include the power supply 711 (for example, a battery) that supplies power to each component. Optionally, the power supply 711 may be logically connected to the processor 710 by using a power management system, so as to implement functions such as charging management, discharging management, and power consumption management by using the power management system.

In addition, the mobile terminal 700 includes some function modules not shown, and details are not described herein.

Optionally, an embodiment of the present disclosure further provides a mobile terminal, including: a processor 710, a memory 709, and a computer program that is stored in the memory 709 and that can run on the processor 710. When the processor 710 executes the computer program, the foregoing processes of the transmission method embodiment applied to the terminal are implemented, and a same technical effect can be achieved. To avoid repetition, details are not described herein again.

Figure 8:
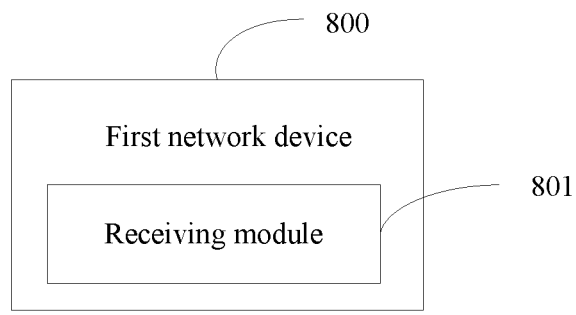
FIG. 8 is a structural diagram 1 of a first network device according to an embodiment of the present disclosure.

Referring to FIG. 8, FIG. 8 is a structural diagram of a first network device according to an embodiment of the present disclosure. As shown in FIG. 8, a first network device 800 includes:

a receiving module 801, configured to receive, by using a target uplink channel, control information sent by a terminal, where the control information corresponds to TRP identifier information, the TRP identifier information is used to determine a target transmission reception point TRP corresponding to the control information, and the target TRP is one TRP in multi-TRP transmission.

Optionally, the TRP identifier information is carried on the target uplink channel.

Optionally, a transmission resource of the target uplink channel is determined based on the TRP identifier information.

Figure 9:
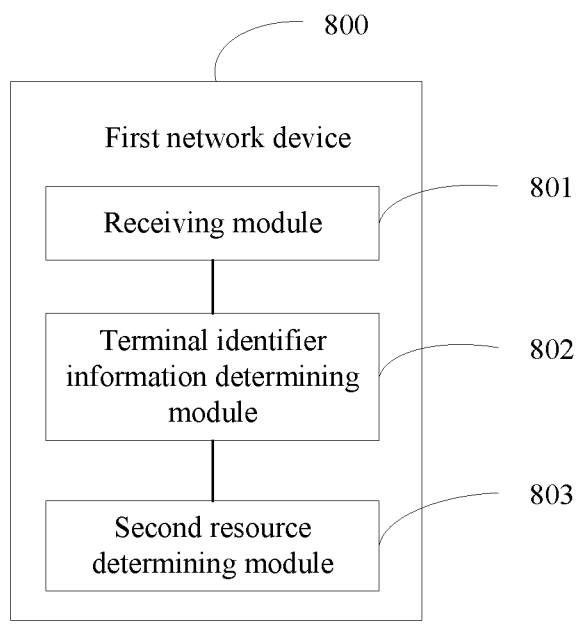
FIG. 9 is a structural diagram 2 of a first network device according to an embodiment of the present disclosure.

Optionally, as shown in FIG. 9, the first network device 800 further includes:

a terminal identifier information determining module 802, configured to: before the control information is received by using the target uplink channel, determine terminal identifier information of the terminal; and a second resource determining module 803, configured to determine the target resource based on the terminal identifier information and the TRP identifier information; and the receiving module 801 is specifically configured to receive, by using the target resource, the control information sent by the terminal.

Optionally, the second resource determining module 803 is specifically configured to:

determine a resource characteristic based on the terminal identifier information and the TRP identifier information; and determine a resource having the resource characteristic as the target resource.

Optionally, the resource characteristic includes at least one of the following characteristics: a characteristic of a beam in which a resource is located, a sending time characteristic of the resource, a time domain characteristic of the resource, and a frequency domain characteristic of the resource.

Optionally, the TRP identifier information is determined based on at least one of the following information:

an identifier of a CORESET corresponding to the target TRP;

an identifier of a search space corresponding to the target TRP;

a predefined TRP identifier;

a scrambling identifier of a CORESET corresponding to the target TRP;

a cell radio network temporary identifier of a cell to which the target TRP belongs; and a field value of at least one field in DCI corresponding to the target TRP.

The first network device provided in this embodiment of the present disclosure can implement the processes in the method embodiment shown in FIG. 4, and a same beneficial effect is achieved. To avoid repetition, details are not described herein again.

Figure 10:
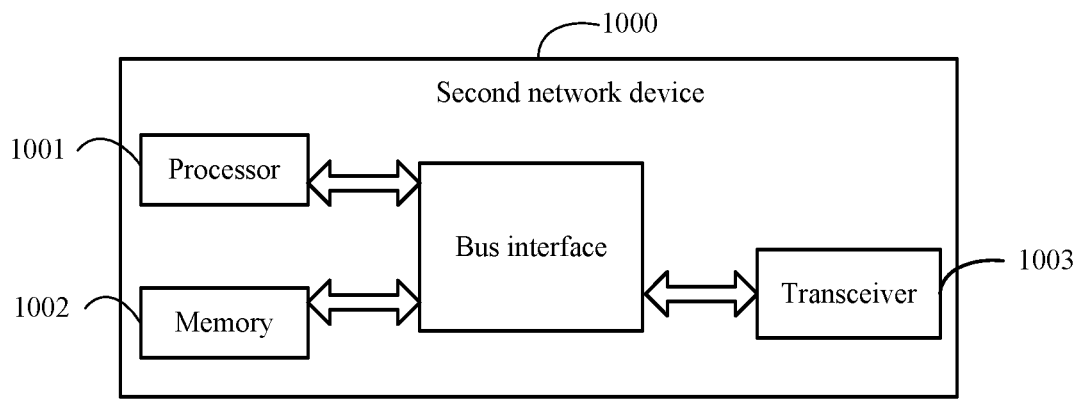
FIG. 10 is a structural diagram of a second network device according to an embodiment of the present disclosure.

Referring to FIG. 10, FIG. 10 is a structural diagram of a second network device according to an embodiment of the present disclosure. As shown in FIG. 10, a second network device 1000 includes a processor 1001, a memory 1002, a transceiver 1003, and a computer program that is stored in the memory 1002 and that can run on the processor 1001.

The transceiver 1003 is configured to receive, by using a target uplink channel, control information sent by a terminal, where the control information corresponds to TRP identifier information, the TRP identifier information is used to determine a target transmission reception point TRP corresponding to the control information, and the target TRP is one TRP in multi-TRP transmission.

Optionally, the TRP identifier information is carried on the target uplink channel.

Optionally, a transmission resource of the target uplink channel is determined based on the TRP identifier information.

Optionally, before the transceiver 1003 receives, by using a target uplink channel, control information sent by a terminal, the processor 1001 is configured to:

determine terminal identifier information of the terminal; and determine the target resource based on the terminal identifier information and the TRP identifier information; and the transceiver 1003 is specifically configured to receive, by using the target resource, the control information sent by the terminal.

Optionally, the step, performed by the processor 1001, of determining the target resource based on the terminal identifier information and the TRP identifier information specifically includes:

determining a resource characteristic based on the terminal identifier information and the TRP identifier information; and determining a resource having the resource characteristic as the target resource.

Optionally, the resource characteristic includes at least one of the following characteristics: a characteristic of a beam in which a resource is located, a sending time characteristic of the resource, a time domain characteristic of the resource, and a frequency domain characteristic of the resource.

Optionally, the TRP identifier information is determined based on at least one of the following information:

an identifier of a CORESET corresponding to the target TRP;

an identifier of a search space corresponding to the target TRP;

a predefined TRP identifier;

a scrambling identifier of a CORESET corresponding to the target TRP;

a cell radio network temporary identifier of a cell to which the target TRP belongs; and a field value of at least one field in DCI corresponding to the target TRP.

The second network device provided in this embodiment of the present disclosure can implement the foregoing processes of the transmission method embodiment applied to the network device, and a same technical effect can be achieved. To avoid repetition, details are not described herein again.

An embodiment of the present disclosure further provides a computer-readable storage medium. The computer-readable storage medium stores a computer program, and when a processor executes the computer program, the foregoing processes of the transmission method embodiment in any of FIG. 1, FIG. 3, and FIG. 4 are implemented, and a same technical effect can be achieved. To avoid repetition, details are not described herein again. The computer-readable storage medium includes a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of the present disclosure shall be subject to the protection scope of the claims.

What is claimed is:

1. A transmission method performed by a terminal, comprising:
   sending at least one piece of control information by using a target uplink channel, wherein:
   each respective piece of control information from the at least one piece of control information corresponds to Transmission Reception Point (TRP) identifier information, the TRP identifier information is used to determine a target TRP corresponding to the respective piece of control information, and the target TRP is a TRP in multi-TRP transmission;
   terminal identifier information of the terminal is determined by a network side device, and a target transmission resource of the target uplink channel is determined based on the terminal identifier information and the TRP identifier information; and
   sending the at least one piece of control information by using the target uplink channel comprises:
      sending, by using the target transmission resource, the respective piece of control information from the terminal.

2. The transmission method according to claim 1, wherein:
   before sending the at least one piece of control information by using the target uplink channel, the transmission method further comprises:
      determining the target transmission resource from candidate resources of the target uplink channel based on the terminal identifier information and the TRP identifier information.

3. The transmission method according to claim 2, wherein determining the target transmission resource from the candidate resources of the target uplink channel comprises:
   determining a resource characteristic based on the set of TRP identifier information; and
   determining, from the candidate resources of the target uplink channel, a resource having the resource characteristic as the target transmission resource.

4. The transmission method according to claim 3, wherein the resource characteristic comprises at least one of the following characteristics: a beam in which the resource is located, a sending time of the resource, a time domain characteristic of the resource, or a frequency domain characteristic of the resource.

5. The transmission method according to claim 1, wherein the TRP identifier information is determined based on at least one of the following information:
   an identifier of a Control Resource Set (CORESET) corresponding to the target TRP;
   a predefined TRP identifier corresponding to the target TRP; or
   a field value of a field in Downlink Control Information (DCI) corresponding to the target TRP.

6. A terminal, comprising: a memory, a processor, and a computer program that is stored in the memory, wherein the computer program, when executed by the processor, implements a transmission method comprising:
   sending at least one piece of control information by using a target uplink channel, wherein:
   each respective piece of control information from the at least one piece of control information corresponds to Transmission Reception Point (TRP) identifier information, the TRP identifier information is used to determine a target TRP corresponding to the respective piece of control information, and the target TRP is a TRP in multi-TRP transmission;
   terminal identifier information of the terminal is determined by a network side device, and a target transmission resource of the target uplink channel is determined based on the terminal identifier information and the TRP identifier information; and
   sending the at least one piece of control information by using the target uplink channel further comprises:
      sending, by using the target transmission resource, the respective piece of control information from the terminal.

7. The terminal according to claim 6, wherein:
   before sending the at least one piece of control information by using the target uplink channel, the transmission method further comprises:
      determining the target transmission resource from candidate resources of the target uplink channel based on the terminal identifier information and the TRP identifier information.

8. The terminal according to claim 7, wherein determining the target transmission resource from the candidate resources of the target uplink channel comprises:
   determining a resource characteristic based on the TRP identifier information; and
   determining, from the candidate resources of the target uplink channel, a resource having the resource characteristic as the target transmission resource.

9. The terminal according to claim 6, wherein the TRP identifier information is determined based on at least one of the following information:
   an identifier of a Control Resource Set (CORESET) corresponding to the target TRP;
   a predefined TRP identifier corresponding to the target TRP; or
   a field value of a field in Downlink Control Information (DCI) corresponding to the target TRP.

10. A network device, comprising: a memory, a processor, and a computer program that is stored in the memory, wherein the computer program, when executed by the processor, implements a transmission method comprising:
   receiving, by using a target uplink channel, control information sent by a terminal, wherein:
   the control information corresponds to transmission reception point (TRP) identifier information, the TRP identifier information is used to determine a target TRP corresponding to the control information, and the target TRP is a TRP in multi-TRP transmission;
   a target transmission resource of the target uplink channel is determined based on the TRP identifier information;
   before receiving, by using the target uplink channel, the control information sent by the terminal, the transmission method further comprises:

determining terminal identifier information of the terminal; and determining a target transmission resource of the target uplink channel based on the terminal identifier information and the TRP identifier information; and receiving, by using the target uplink channel, the control information sent by the terminal comprises:

receiving, by using the target transmission resource, the control information sent by the terminal.

11. The network device according to claim 10, wherein the TRP identifier information is carried on the target uplink channel.

12. The network device according to claim 10, wherein receiving, by using the target uplink channel, the control information sent by the terminal comprises:

receiving, by using the target transmission resource, the control information sent by the terminal.

13. The network device according to claim 10, wherein determining the target transmission resource based on the terminal identifier information and the TRP identifier information comprises:

determining a resource characteristic based on the terminal identifier information and the TRP identifier information; and determining a resource having the resource characteristic as the target transmission resource.

14. The network device according to claim 13, wherein the resource characteristic comprises at least one of the following characteristics: a characteristic of a beam in which the resource is located, a sending time characteristic of the resource, a time domain characteristic of the resource, or a frequency domain characteristic of the resource.

15. The network device according to claim 10, wherein the TRP identifier information is determined based on at least one of the following information:

an identifier of a Control Resource Set (CORESET) corresponding to the target TRP;

a predefined TRP identifier corresponding to the target TRP; or a field value of a field in Downlink Control Information (DCI) corresponding to the target TRP.

* * * * *